(12) United States Patent
Chandrasekaran et al.

(10) Patent No.: US 10,459,960 B2
(45) Date of Patent: Oct. 29, 2019

(54) CLUSTERING A SET OF NATURAL LANGUAGE QUERIES BASED ON SIGNIFICANT EVENTS

(71) Applicant: International Business Machines Corporation, Armonk, NY (US)

(72) Inventors: Swaminathan Chandrasekaran, Coppell, TX (US); Joseph N Kozhaya, Morrisville, NC (US); Lakshminarayanan Krishnamurthy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/346,364

(22) Filed: Nov. 8, 2016

(65) Prior Publication Data

US 2018/0129733 A1    May 10, 2018

(51) Int. Cl.
*G06F 16/33* (2019.01)

(52) U.S. Cl.
CPC .................. *G06F 16/3344* (2019.01)

(58) Field of Classification Search
CPC ......... G06F 17/30684; G06F 17/30705; G06F 17/30867; G06F 16/3344
See application file for complete search history.

(56) References Cited

U.S. PATENT DOCUMENTS

| | | | |
|---|---|---|---|
| 8,145,623 B1* | 3/2012 | Mehta ................... | G06F 16/355 707/713 |
| 8,195,655 B2 | 6/2012 | Agarwal | |
| 8,204,878 B2 | 6/2012 | Amer-Yalia | |
| 8,806,464 B2 | 8/2014 | Dewey | |
| 8,898,148 B1* | 11/2014 | Yagnik ................ | G06F 16/9535 707/721 |
| 2001/0044795 A1* | 11/2001 | Cohen ................ | G06F 17/30699 |
| 2003/0037034 A1* | 2/2003 | Daniels ................ | G06Q 10/087 |
| 2005/0055357 A1* | 3/2005 | Campbell ................ | G06F 8/61 |
| 2005/0060287 A1 | 3/2005 | Hellman | |
| 2008/0249786 A1* | 10/2008 | Oldham ............ | G06F 17/30864 705/1.1 |

(Continued)

FOREIGN PATENT DOCUMENTS

KR    101306667 B1    9/2013

OTHER PUBLICATIONS

Nunes, B. P., Dietze, S., Casanova, M. A. et al. (2013). Combining a co-occurrence-based and a semantic measure for entity linking. In The Semantic Web: Semantics and Big Data, 548-562.

(Continued)

*Primary Examiner* — Jay A Morrison
(74) *Attorney, Agent, or Firm* — Jeffrey S LaBaw; Feb R Carbrasawan (57) ABSTRACT

Clustering a set of natural language queries NLQs based on a set of significant events retrieved from a corpus stored in a computer system is described. A set of NLQs is used by a search engine for searching a selected corpus to retrieve respective sets of significant events. The set of NLQs is clustered into a plurality of NLQ clusters according to a threshold number of common significant events being returned by the search engine for respective members of an NLQ cluster.

16 Claims, 8 Drawing Sheets

(56) References Cited

U.S. PATENT DOCUMENTS

| | | | | |
|---|---|---|---|---|
| 2010/0174670 A1* | 7/2010 | Malik | ................... | G06F 16/35 706/12 |
| 2012/0254162 A1* | 10/2012 | Asadullah | ......... | G06F 17/30657 707/723 |
| 2013/0124561 A1 | 5/2013 | Prandhan | | |
| 2013/0191317 A1 | 7/2013 | Perron | | |
| 2013/0262361 A1 | 10/2013 | Arroyo | | |
| 2014/0046934 A1 | 2/2014 | Zhou | | |
| 2014/0089330 A1* | 3/2014 | Cui | ................... | G06F 17/30997 707/749 |
| 2015/0006512 A1 | 1/2015 | Alfonseca | | |
| 2016/0140232 A1* | 5/2016 | Smirnov | ............... | G06F 16/951 707/768 |

OTHER PUBLICATIONS

Zhang, L., Liu, B., Lim, S. H. et al. (2010). Extracting and ranking product features in opinion documents. In Proceedings of the 23rd international conference on computational linguistics: Posters, 1462-1470.

Pudota, N., Dattolo, A., Baruzzo, A. et al. (2010). Automatic keyphrase extraction and ontology mining for content-based tag recommendation. International Journal of Intelligent Systems, 25(12), 1158-1186.

Schuhmacher et al. "Knowledge-based graph document modeling" WSDM'14, Feb. 24-28, 2014, New York, New York, US.

Zou et al. "Natural language question answering over RDF: a graph driven approach" SIGMOD'14, Jun. 22-27, 2014 Snowbird, UT, US.

IBM Patents or Patent Applications Treated as Related.

Schuhmacher et al., "Knowledge-based Graph document modeling" WSDM ' 14, Feb. 24-28, 2014, New York, New York, USA, 2014.

Zou et al., "Natural language question answering over RDF: a graph data driven approach," SIGNOD'14, Jun. 22-27, 2014, Snowbird, UT, USA (2014).

* cited by examiner

CLUSTERING A SET OF NATURAL LANGUAGE QUERIES BASED ON SIGNIFICANT EVENTS

BACKGROUND OF THE INVENTION

This disclosure relates generally to machine learning. More particularly, it relates to teaching a machine learning system to cluster a set of natural language queries based on significant events.

It is known for a computer to receive a natural language query and perform a search on a database or corpus of documents based on keywords identified in the query. In a natural language query, it is typical for a parser to identify some of the words in the query as more meaningful than others in the query. For example, common words such as articles, "the", "a" and "an" are rarely accorded the importance of a keyword, while nouns are often selected by the system as keywords. The system accepts a natural language query (NLQ) as an input, extracts keywords of interest from the query and identifies relevant articles, documents or events in the database or corpus based on the keywords identified in the query. Keywords are sometimes grouped as "entities", also referred to as named entities, which are effectively clusters of keywords that share certain properties. Some common examples of entities are places, persons or organizations.

In the prior art, the identified keywords derived from a natural language query are largely limited to the keywords which occur within the actual query, perhaps augmented by a list of synonyms of the identified keywords from a dictionary or thesaurus.

Further improvements in the computer aided search mechanisms are needed.

BRIEF SUMMARY

According to this disclosure, a method, apparatus and computer program product for clustering a set of natural language queries NLQs based on a set of significant events retrieved from a corpus stored in a computer system. A set of NLQs is used by a search engine for searching a selected corpus to retrieve respective sets of significant events. The set of NLQs is clustered into a plurality of NLQ clusters according to a threshold number of common significant events being returned by the search engine for respective members of an NLQ cluster.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, preferred embodiments of the invention provide a deep level identification and scoring of significant events by a machine learning system. By extracting keywords or entities from events identified in successively deeper levels of a search, new relationships and events are identified. The machine learning system returns the discovered significant events ranked by score. Once the machine learning system has processed multiple natural language queries (NLQs), the NLQs can be clustered based on commonalities between the returned significant events. Clustering the queries can be used for various purposes as will be described herein.

Figure 1:
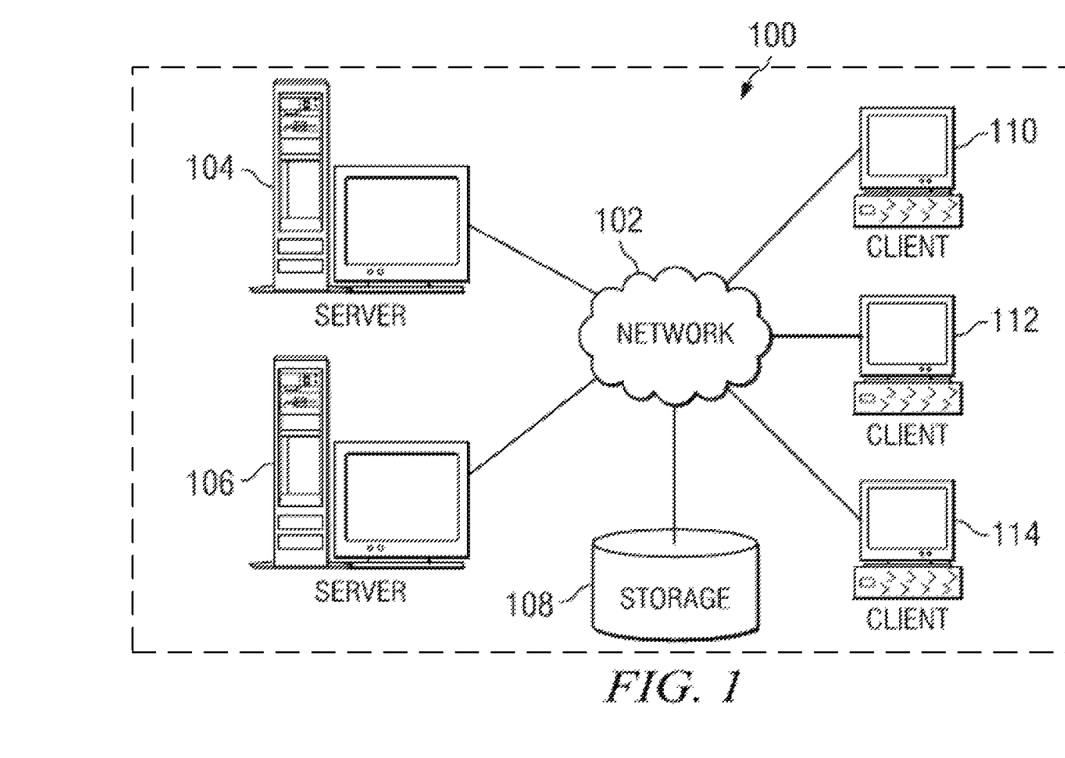
FIG. 1 depicts an exemplary block diagram of a distributed data processing environment in which exemplary aspects of the illustrative embodiments may be implemented.
Figure 2:
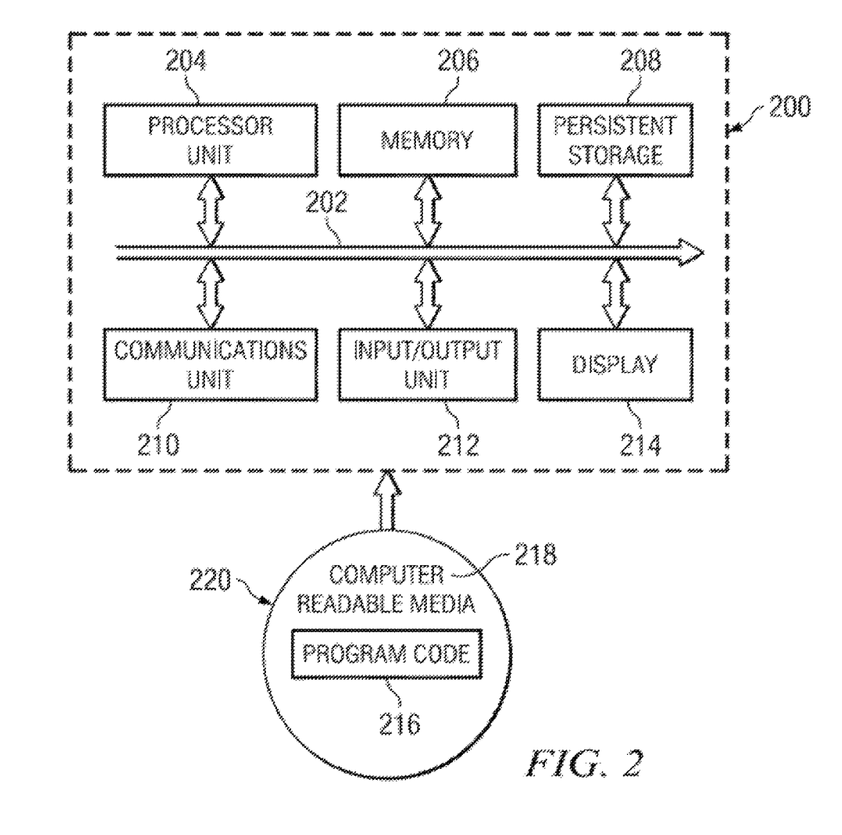
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the drawing, mainframe computer 116 is shown connected to network 102. Mainframe computer 116 can be, for example, an IBM System z mainframe running the IBM z/OS operating system. Connected to the mainframe 116 are mainframe storage unit 118 and client 120. Client 120 is either a PC connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

In the prior art, it is known for a search engine to identify keywords in a natural language query (NLQ) to return pertinent search results to a user. For example, a prior art search engine accepts a natural query as input, extracts entities of interest from the query and identifies relevant events in the news based on that query. However, the prior art search mechanisms known to the inventors stop at analyzing the set of returned articles for keywords to determine which ones of the articles are most relevant or significant to the entities in the natural language query itself. An example of an "event" in the case of a news search engine is a news article. These search mechanisms extract events from a corpus based on the entities in the NLQ, for example, where the corpus is a set of news articles, and if the article includes the entity (or entities) of interest, they return that news article in a predefined format to the user, e.g., a digest of the article, its title and the uniform resource locator (URL) at which it can be found.

Embodiments of the present invention provide a deeper analysis by leveraging knowledge graphs to identify deep level events that are significant to the NLQ results. Further, a significance score for the deep level event is calculated. One important aspect in this disclosure is to extract deep level entities and events based on a natural language query and use a metric of mutual information (MMI) for such entities to compute a significance score for such events. Thus, a search system built according to the teachings of the present invention is more effective than prior art systems at identifying significant events.

The event retrieved by a search engine will depend on the subject matter covered by the corpus. In a news reporting search engine, an article is considered an event. In media, a new release of a video or an album can be an event. In financial domain, filing a quarterly report could constitute an event. In healthcare, an event can be a patient's visit to the doctor's office or a patient's admission to a hospital.

In preferred embodiments of the invention, in addition to the entities directly extracted from the natural language query, a knowledge graph is explored to identify other entities strongly connected to original entities and extract their impact and significance on other entities in NLQ. The knowledge graph is created based on the corpus stored in the system. In preferred embodiments of the invention, the corpus includes of all sets of documents being considered by the application. In one example, the corpus would be the list of all news articles being searched against. The other entities are discovered based on a co-occurrence metric or a metric of mutual information (MMI) in different preferred embodiments of the invention.

Keywords, as used in the invention, includes both keywords and entities. Entities are keywords with certain properties. Entities, for example, are clusters of keywords that share some property in one embodiment of the invention. For example, a PERSON entity is the set of all keywords such as Joe, Jim, Juliana, Julie, that are PERSONs. This is a common definition of what an entity is. Knowledge graphs in embodiments of the invention are built by identifying entities of interest in the domain and the relations between such entities. In the description that follows, preferred embodiments of the invention refer to examining entities, however, in alternative embodiments, other types of keywords can be used.

In embodiments of the invention, keywords are all words of interest. With a large corpus, the keyword list can be unwieldy at it is a huge list. In other embodiments of the invention, entities are used. Entities, on the other hand, are clusters of keywords which share some properties. It is the relations between entities that allow the system of the present invention to extract insights. As an example, if an entity of PERSON is used which includes keywords like Joe, Jim, Jeff, Jennifer, and so on. When the system in some embodiments builds a knowledge graph with the keywords, there are 2 challenges: (i) It is not scalable as there a large number of keywords, i.e. all words in the English language of interest and in the knowledge graph, there will be at least a square complexity of keywords (relations between keywords) and (ii) the system will probably not identify much insight as there is not enough data to show how Joe appears in a corpus. Also, what the system learns about Joe would not apply to Jim or Jeff. On the other hand, if the system uses entities; there is a much smaller set of entities, typically, tens of entities. What the system learns about an entity applies to all keywords of that entity. So if the system learns that Joe and Jim and Jeff have a property "name", then the system infers that any keyword in that entity PERSON has a property "name". So in preferred embodiments of the invention, the use of entities is preferred. However, for a small corpus, in alternative embodiments, the system could be applied to keywords.

The significance of an event is very dependent on the corpus of interest and on the natural language query being considered. For a given corpus C, the method builds a knowledge or co-occurrence graph consisting of nodes representing entities/keywords and edges representing the relations between these entities/keywords. It is typical and standard for the user to provide the corpus depending on the application. For example, a healthcare application may define the collection of all PubMed papers as the corpus. On the other hand, an application focused on Diabetes, would define the corpus to be the collection of PubMed papers discussing Diabetes. For a news applications, the corpus can be all news articles or it could be a subset of news articles over a period of time or it could be a subset of news articles over a set of locations. In embodiments, the knowledge graph includes information on the co-occurrence of two entities within respective events in the corpus. For example, the knowledge graph could have the MMI score labeled on edges between entities placed at the nodes of the knowledge graph. In preferred embodiments of the invention, any edges with small MMI scores get filtered out. A process and architecture for building the knowledge graph is discussed below with reference to FIGS. 5 and 6.

The metric of mutual information score is a measure of how related two entities are within a corpus. For example, one definition for MMI would be:

$$MMI(w1,w2)=N(w1,w2)/N(w1)*N(w2),$$

Where the MMI score of entities w1 and w2 equals the number of articles in which both w1 and w2 occur divided by the product of the number of articles in which w1 occurs and the number of articles in which w2 occurs. One skilled in the art will recognize that alternative formulas may be used for calculating a mutual information score.

Figure 3:
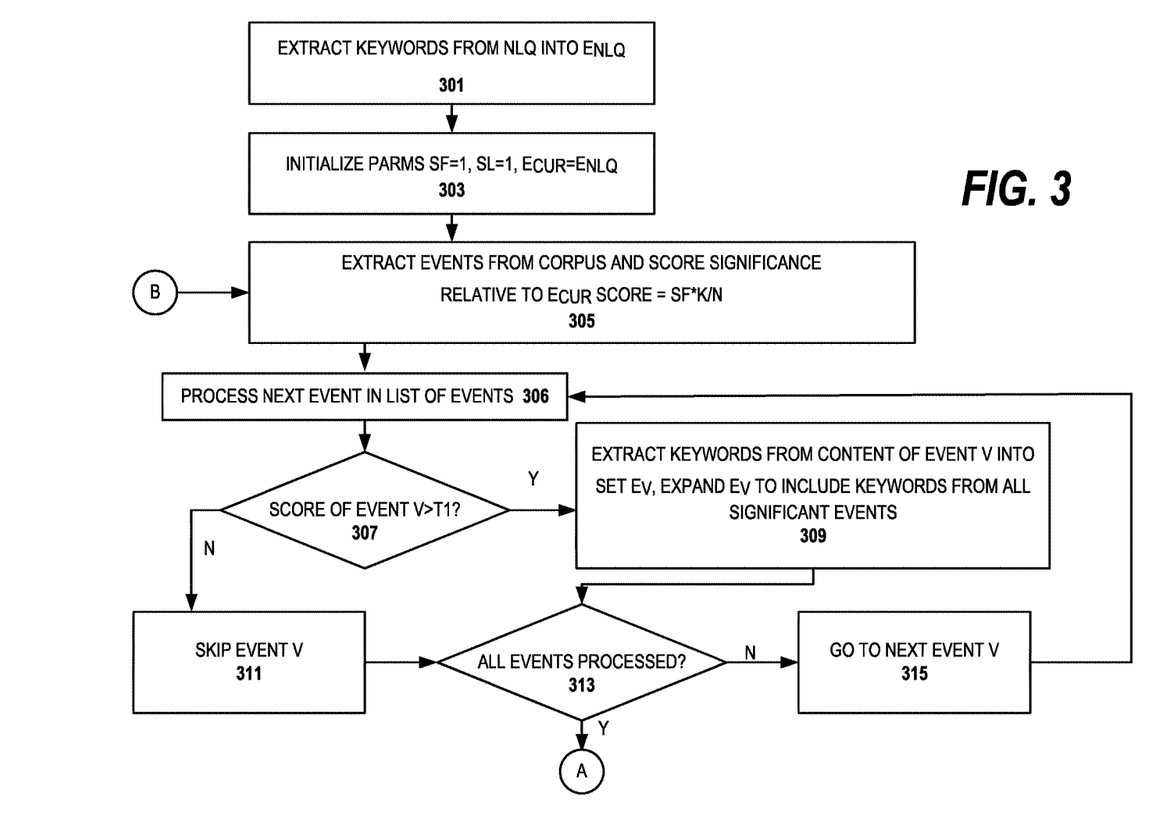
FIG. 3 illustrates a flow diagram of extracting entities and keywords from a natural language query according to an embodiment of the invention.

The process after building the knowledge graph for one embodiment of the invention is shown in FIG. 3. Given a natural language query NLQ, the method computes the score of the significance of the event, i.e. article. In step 301, the system extracts entities/keywords from the specified natural language query.

Let set ENLQ={set of extracted entities/keywords from NLQ}

There are several algorithms and services for extracting entities from text. One solution is to use the Alchemy Language Entity Extraction from the IBM Corporation, however, those skilled in the art would use other extraction techniques in alternative embodiments. For domain specific usage, the system can use specialized dictionaries relevant to that domain and assign weights on how certain entities should be extracted. For example, where the entities are companies and the terms "acquire" or "acquisition" are encountered, the system can use a rule that a strong weight should be used to describe the relationship between the two companies.

Next in step 303, the initial parameters are set. The set of current entities, Ecur, is set to the set of extracted entities/keywords from the specified NLQ. That is, Set Ecur=ENLQ The significance level, sl, and scaling factor, sf, are also set. As initial parameters, the significance level can be set to 1, i.e. sl=1, to denote the first pass through the system and the scaling factor can also be as 1, i.e. sf=1.0, to indicate the events found in the first pass are to be given full weight in the analysis. As will be described below, events identified in subsequent passes have scaling factors less than 1, and so events are given progressively lower weights in later passes in the analysis.

Next in step 305, the system searches for and extracts events in the corpus to find ones which include the extracted entities in the current set of entities, set Ecur. For example, in one embodiment where events are articles, the articles are searched for occurrences of the entities identified in the specified NLQ. The search will include searching the titles and/or body of news articles, and can include searching geo-location and metadata tags associated with the article. Also in step 305, the significance of an event is scored based on the number of or the number of times the entities or keywords from the specified NLQ occur in the respective event. In preferred embodiments of the invention, the system scores the significance of these events as follows:

If event includes k entries in set Ecur, then its score is:

$$s=sf*k/N \text{ where } N=|Ecur| \text{number of entries in NLQ}$$

However, those skilled in the art will recognize that other algorithms based on the number of or the number of times the entities or keywords from the specified NLQ occur in the articles could be used.

In step 306, the first event in a list of events is processed. In step 307, the score of the event or article is evaluated to determine whether the event is a significant event. If an event v has a score sv larger than a user or system specified threshold, i.e. sv>t1, it is a significant event. In step 309, the system extracts keywords or entities from the content (or body) of that event v. The system then assigns the extracted keywords or entities from event v to set Ev. In embodiments of the invention, the events in a pass which are used as a sources for the set of extracted keywords or entities, i.e. have scores greater than the threshold, are used for the next level sl+1 of analysis. If the event does not have a score greater than the specified threshold, the event is skipped in the analysis process, step 311.

A decision is made whether all the events having thresholds greater than the specified threshold have been processed, step 315. If not, the system returns to step 306, to process the next event. The process continues to extract the keywords and/or entities from significant events and add them to set Ev.

Figure 4:
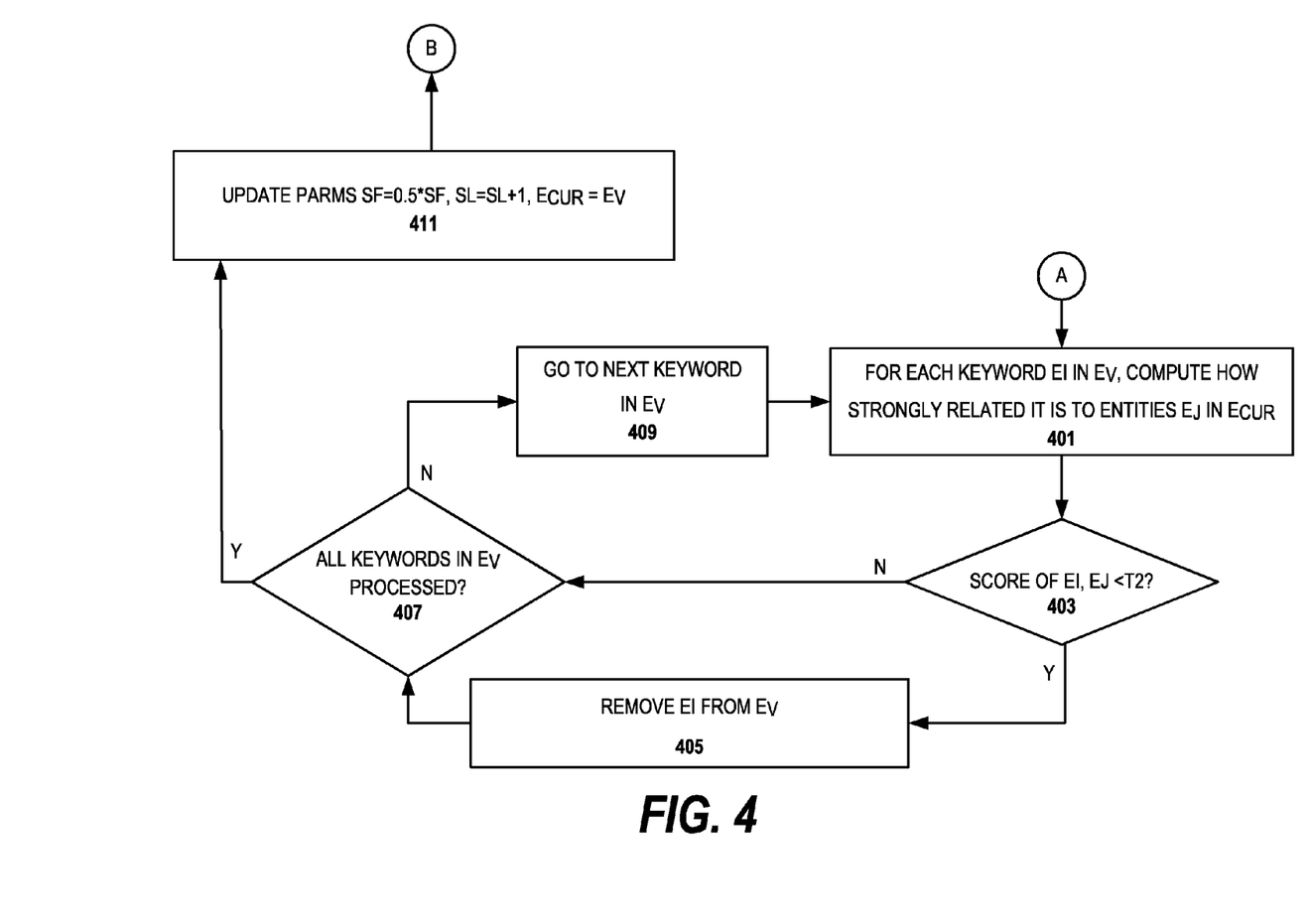
FIG. 4 illustrates a flow diagram of computing how strongly a given entity or keyword is related to a set of entities according to an embodiment of the invention.

The process continues as depicted in FIG. 4. In step 401, the system determines the strength of the relationships between the keywords and entities extracted from the significant events and the keywords and entities extracted from the original NLQ. In preferred embodiments of the invention, the system performs this step by computing the MMI score for each of the entities in Ev and entities in Ecur.

In one embodiment, the calculation is as follows, for ei in Ev and ej in Ecur, $$MMI(ei,ej)=sum(MMIp(ei,ej))$$

where p denotes a path from ei to ej in the knowledge graph, and

MMIp(ei,ej)=MMI(ei,ei+1)*MMI(ei+1,ei+2)* . . . *MMI(ej−1,ej)

where ei+1, ei+2, ej−1 denote the entities along the path in the knowledge graph from ei to ej.
The MMIs along the path are summed in this manner to account for the possibility of multiple paths from entity ei to entity ej. For example, if Joe is entity ei and Jim is entity ej, then Joe and Jim could be related in multiple ways. For example, the entities could be related via work, e.g., they both work for same company. They could also be related via family, e.g., Joe and Jim could be brothers-in-law. When computing how strongly connected Joe and Jim are, one path would be through "company A" and another path could be through "family". To get total MMI, embodiments of the invention sum the MMIs across multiple possible paths between Joe and Jim.

Those skilled in the art will recognize that other formulas can be used to calculate the effect of the indirect relationships of entities in the knowledge graph. Further, other methods of computing MMI are implemented in alternative embodiments. The idea is to capture how strongly connected Joe and Jim are via knowledge graph traversal. A knowledge base can be used to determine how strongly connected entities are. For example, in a search engine scenario, it could be that two entities, e.g., presidential candidates Tom and Clara, are searched for by a larger number of people in a short window of time; that could be indicative of strong connection between the entities. By monitoring how many times people search for the two entities over a period of time and entering the data in the knowledgebase, embodiments of the invention can determine how strongly correlated the two entities are and weight the relationships in the knowledge graph accordingly.

Next, in step 403, the system filters out the keywords and entities which do not have strong relationships with the keywords and entities in set Ecur. Note that initially Ecur is the set of entities extracted from natural language query; however, in subsequent iterations Ecur includes other entities that were found to be important in subsequent passes. In embodiments of the invention in which an MMI score is used to determine the strength of a relationship, the system filters out the entities which have low MMI scores with respect to entries in original list. In one preferred embodiment, if MMI(ei,ej)<t2, as determined in step 403, then the system removes the entity ei from the list of extracted entities, Ev, in step 405.
Note that in the exemplary embodiment, even if original entity and identified entity never co-occur in the same article, their derived MMI score is not 0, but is the sum of the product of MMI scores across all paths from one entity to another in the knowledge graph.

The system continues to filter entities and keywords in the initially extracted group of entities and keywords, i.e. those extracted from the significant events. As shown in FIG. 4, a test is performed, step 407, to determine whether all the keywords/entities have been processed. If not, in step 409, the next keyword/entity in the initially extracted group of keywords/entities is processed by the system.

Once all the extracted keywords or entities from the significant events have been processed, in step 411, the filtered set of keywords/entities are aggregated into a set of derived entities Ev. Step 411 also updates the parameters for the next iteration of analysis. In the step, the current set of entities is set to filtered set of entities, i.e.

Set Ecur=Ev

The new set of entities will typically not include the original set of entities extracted from NLQ as those entities have already been processed and the embodiment has found all significant events associated with those entities. In preferred embodiments of the invention, an explicit step removes any entities that exist in step By which have already been processed by the system. The existing processed entities are added to a set Eprocessed; that is, when an entity is already searched to identify associated events it gets added to Eprocessed. Then at this step, the system compares By to Eprocessed and define Ecur=Ev−Eprocessed.

Next, the system increments the significance level by 1, i.e. sl=sl+1, indicating that the analysis is occurring at a deeper level. The system reduces the scaling factor by a predetermined amount. In one embodiment, the system multiplies the previous scaling factor by a factor less than one, e.g., 0.5, so that sf=sf*0.5. The purpose of reducing the scaling factor is that as the analysis goes into deeper levels, the effect of the significance of the extracted events becomes less. While the system needs to capture significant events and entities from the significant events, the events and entities in subsequent passes should be scored appropriately.

The process returns to step 305 in FIG. 3, where events are extracted from the corpus and the significance of the relationships are scored. In the second pass, the new entities identified from the first pass are used to search for a new set of events, e.g., articles, which will be evaluated for the strength of their relationships to the original set of entities extracted from the NLQ. In preferred embodiments of the invention, the corpus stays the same for all the passes. In each pass, the set of entities identified is different in preferred embodiments of the invention. In pass 1, the set of entities came from the original NLQ. In pass 2, the set of entities is based on what the system found in pass 1. The process continues until all entities of significance (and corresponding significant events) have been identified. After a few iterations, the inventors expect to have found all entities and events of significance. In some embodiments of the invention, a limit is set for the number of passes (for example, 10 passes), beyond which the scaling factor is too small to capture any meaningful significant events.

At every iteration, there is a new set of entities extracted which is based on the previous pass. In preferred embodiments of the invention, only new "unprocessed" entities are included in the new set of entities identified for the next pass. In preferred embodiments of the invention, the system iterates until set Ecur is empty and there are no further entities to explore.

All the found significant events across all passes are returned with the corresponding significance scores as computed. Because the scaling factor is smaller in subsequent passes, the events in these passes are less likely to exceed the threshold, as to exceed the threshold there will need to be a proportionately greater number of entities in the current entity set in the event. Those skilled in the art will appreciate that other algorithms and curves which reduce the value of the scaling factor in successive passes can be used in alternative embodiments of the invention. The significance of events is reduced for events first returned in successive passes because significant events are most likely to have been returned in early searches if they are closely related to the entities in the NLQ. However, because there will be some important events returned in the successive passes, the present invention will provide better results than prior art search techniques which rely on a single level approach.

The strength of MMI is dependent on the corpus and the NLQ. In preferred embodiments of the invention, a huge corpus is used, such as all the news articles or all medical publications. With such a corpus, a knowledge graph is built by identifying all the entities (nodes in graph) and relations of interest (edges in graph). Once that graph is established, MMI is used to compute how strongly connected entities are by traversing graph and identifying paths between entities.

In some embodiments of the invention, the entities are grouped into entity types. For example, one type of entities might be companies, another type of entities might be company presidents and yet another type of entities might be where the companies are incorporated.

Suppose that the initial NLQ contained two entities, company A and company B. For example, "find articles about Company A and Company B". Suppose further that Company A and Company B were in different industries and that they were not often discussed in the same articles, since the analysts which covered each industry tended to compare other companies in the same industry with one another. In the prior art, relatively few articles would be returned. However, if company A and company B shared important indirect links, the present invention would return events, e.g., articles, because of the indirect links. For example, suppose that company A and company B shared a number of executives and customers. The present invention would reveal relationships between the two companies that a prior art search would not.

Figure 5:
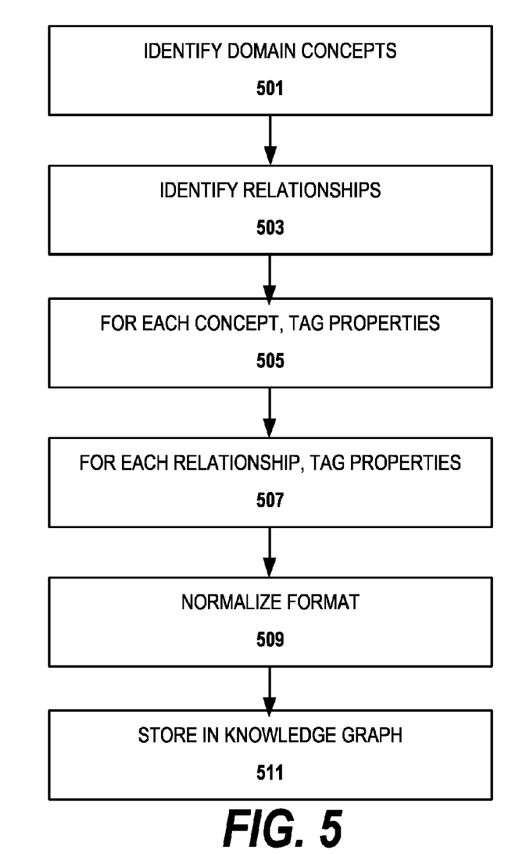
FIG. 5 illustrates a flow diagram of creating a knowledge graph using a set of entities according to an embodiment of the invention.
Figure 6:
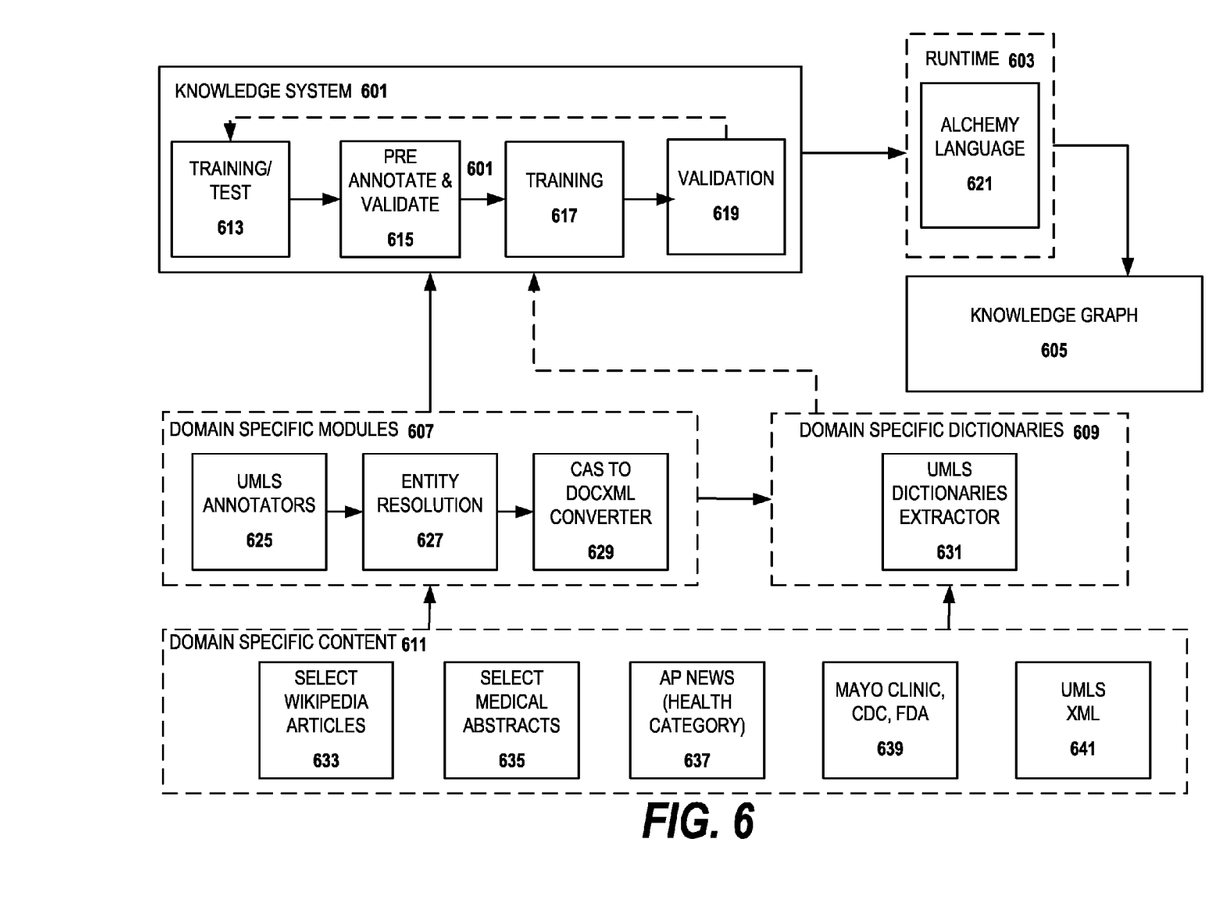
FIG. 6 is an architectural diagram of creating a knowledge graph according to an embodiment of the invention.

The construction of a knowledge graph is illustrated in FIGS. 5 and 6. In step 501, the knowledge system identifies and extracts domain concepts from the corpus. Domain concepts are members of a set of entities relevant to the given application domain. For example, if it is a medical application, then the domain concepts would be entities like "drugs", "diseases", "doctors", and "treatments". Next, in step 503, the system identifies and extracts relationships between the extracted domain concepts. For each concept, the system tags the concept properties in step 505, e.g., name, type, effectiveDate, valid, score. A score could reflect the exactness of the concept versus similar concepts. In step 507, the system tags relationship properties. That is, for each relationship between concepts, the system tags the relationship properties, for example, relation name, type, cardinality, score. For a relationship property, the score can represent the depth of the relationships. In preferred embodiments of the invention, the relationships are summarized by the MMI scores or co-occurrence scores. In step 509, the format for the extracted domain concepts, relationships, domain concept properties, relationship properties is normalized into a standard format used by the knowledge system. The normalized data is stored in an appropriate format such as a "property" graph using nodes and edges. In a typical knowledge graph, the nodes represent the concepts, or, in the present invention, entities and the edges represent the relationships.

In preferred embodiments of the invention, system provides a layer or abstraction to access the knowledge graph (either custom or standard APIs such as Tinkerpop).

In FIG. 6, an illustrative architecture for creating a knowledge graph is illustrated in a medical embodiment of the invention. A knowledge system 601 retrieves domain specific annotated data from documents and a domain specific dictionary to produce a standardized data model for use by a runtime 603 which uses the model to create the knowledge graph 605. The knowledge system retrieves the annotated data from a set of domain specific modules 607 and the domain specific dictionary from a set of domain specific dictionaries 609. Parts of the domain specific modules 607 and the domain specific dictionaries 609 are derived from domain specific content 611.

The knowledge system 601 in this embodiment of the invention is shown with a training/test component 613, a preannotation and validation component 615, a training or machine learning component 617 and a final validation component 619. These components are used in a machine learning process to build a domain specific knowledge graph; in this example, the knowledge graph is for a medical domain. The training/test component 613 defines training and test sets of documents. The preannotation and validation component 615 involves annotating the training and test sets based on the dictionaries extracted in block 631 and the UMLS annotators/entity extractors in blocks 625, 627 and 629. The training or machine learning component 617 trains the Machine Learning system based on the annotations by the preannotation and validation component 615. The final validation component 619 validates that the results of the statistical machine learning model will generalize to an independent data set. As is illustrated, there is a feedback loop which describes an iterative process to improve the performance results of the constructed data model.

The runtime 603 in a preferred embodiment uses the IBM Alchemy language service 621 to build the knowledge graph 605 using the data model and corpus. Those skilled in the art would recognize that other machine learning languages can be used to build the knowledge graph. The domain specific modules 607 include Unified Medical Language System (UMLS) annotators 625, an entity resolution module 627 and a CAS to DOCXML converter 629. CAS (Common Analysis Structure) is the central data structure through which all UIMA (unstructured information management architecture) components communicate. UMLS annotators 625 are modules that run against the text coming from content sources and annotating that text with the correct labels based on pre-defined rules.

Entity resolution module 627 extracts entities of interest from the produced annotations.

An output of the domain specific modules 607 can be used to help build the domain specific dictionaries 609 which may include UMLS based dictionaries. UMLS dictionaries extractor 631 is a module to extract UMLS dictionaries based on the content sources and the UMLS annotators.

The illustrative embodiment shows building a knowledge graph 605 in a medical knowledge domain. Thus, the domain specific content 611 includes selected Wikipedia articles 633 (in the medical field), selected medical abstracts 635, AP news in the health category 637, other health related databases from sources such as the Mayo Clinic, CDC and FDA 639 and ULMS XML data 641 pertaining to the health field. In other embodiments of the invention, the domain specific content would be selected to be appropriate to that knowledge domain.

Figure 7:
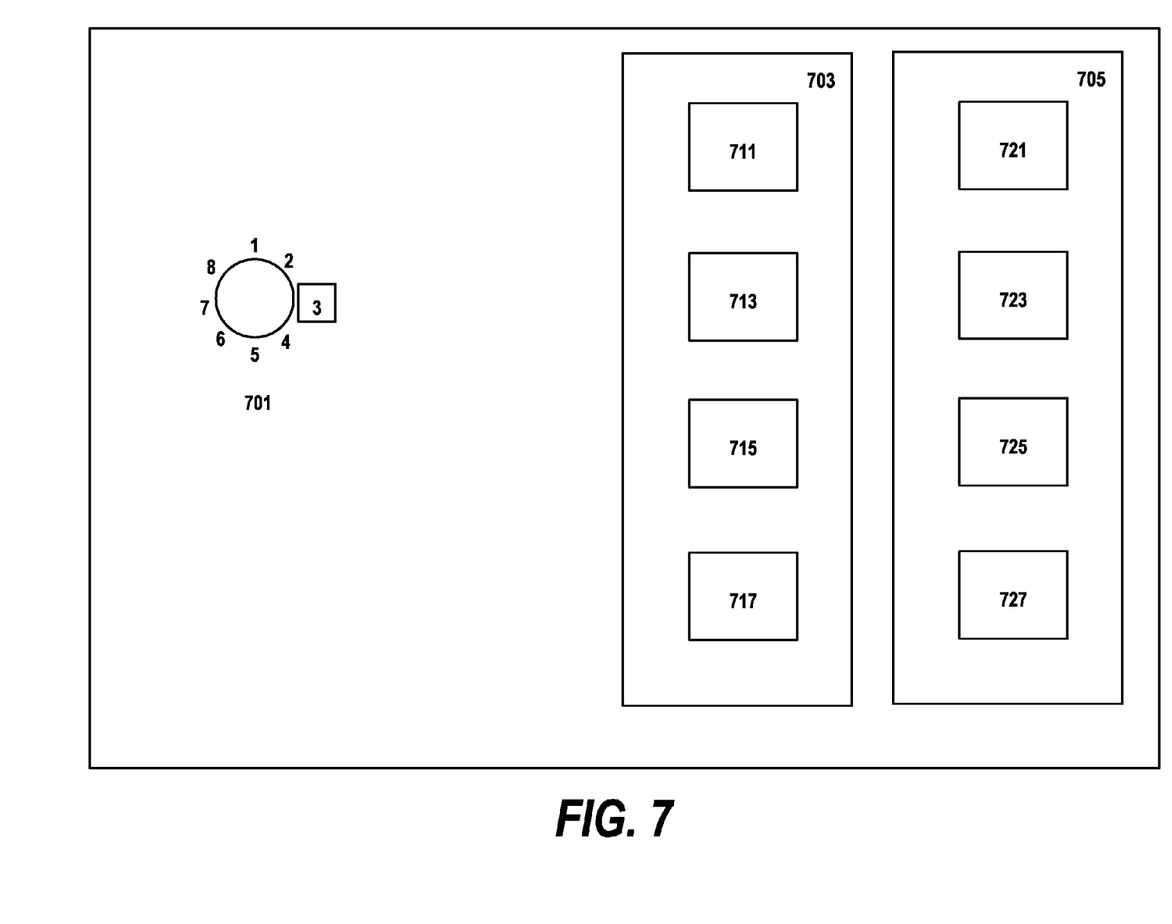
FIG. 7 illustrates a diagram of a user interface according to an embodiment of the invention.

As shown in FIG. 7, in preferred embodiments of the invention, a user interface allows the user to retrieve significance of events based on the "depth" of search, or number of passes performed by the system. The user interface may have a control 701 which selects the depth of searching. For example, level 1 searches events using only the NLQ entities, level 2 searches would be a 2-level deep search for events and significance using a 2-level deep search according to the invention and level N would be an N-level deep search for events and significance according to the invention. As shown in the drawing, the user has set the control for a 3-level deep search. After the search is performed according to the depth selection of the user, the most relevant events are displayed to the user in display panes 703 and 705. In preferred embodiments of the invention, each display pane can be used to display the events from different depths of searching. Display pane 703 shows the results, i.e. the events, 711, 713, 715 and 717 from the user selected level of searching, while Display pane 705 shows the results from the previous or following depth of searching. In this way, the user can see whether further depths of searching are likely to retrieve new events as if the most relevant events from both levels of searching are identical, then the user selected depth is adequate.

Alternatively, the search results can be stored for every level of the search, either up to a predefined limit or when the search system stops identifying new entities, and the selection of the level by the control shows different views, each view showing the results for a particular depth of searching.

In preferred embodiments of the invention, the Natural Language Queries are clustered based on the returned significant events. With use, the system collects many, many NLQs and then for each, it is serving up a set of most significant events. Then, the system looks at commonalities across returned events to cluster the queries. Clustering is a method of unsupervised learning, and a common technique for statistical data analysis used in many fields. Several types of clustering techniques are known in machine learning applications such as centroid (e.g., K-means) clustering, connectivity based clustering, graph based clustering and distribution based clustering which are used in alternative embodiments of the invention. Clustering the NLQs can be used for various purposes such as type-ahead and query expansion where other queries are suggested based on initial query user inputs.

Figure 8:
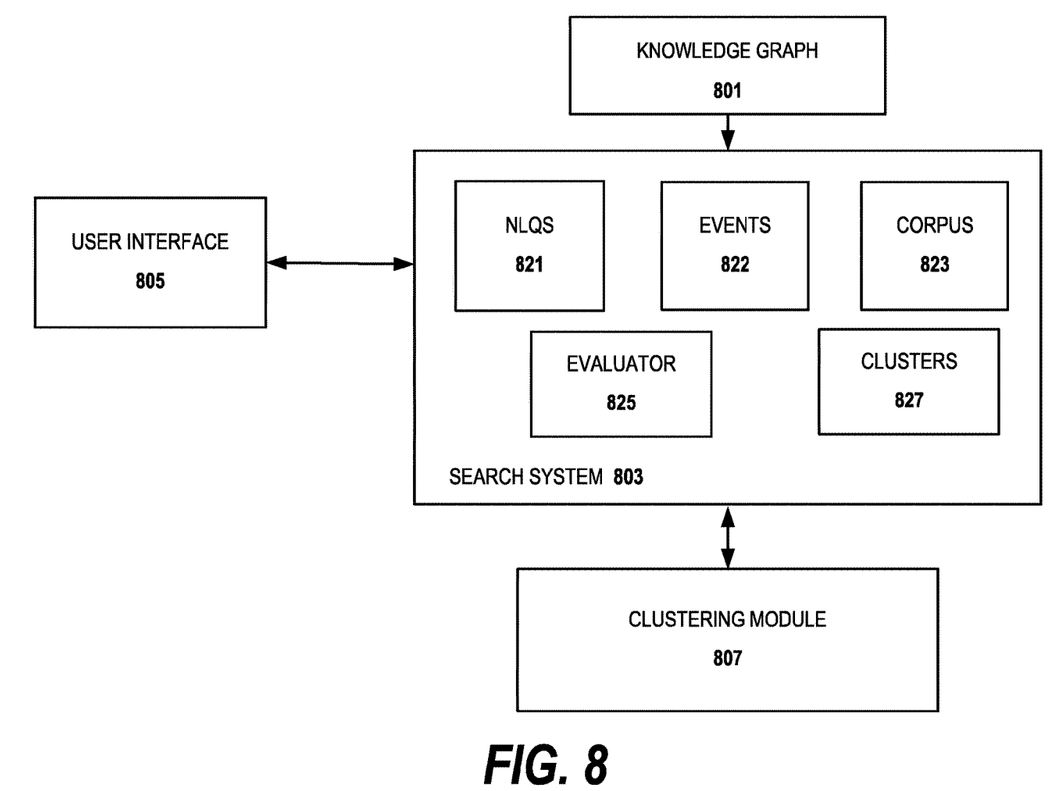
FIG. 8 is an architectural diagram for creating clusters from a knowledge graph according to an embodiment of the invention.

In FIG. 8, an architecture in one preferred embodiment for creating clusters from a knowledge graph is illustrated. A knowledge graph 801 is used as an input to the search system 803. The search system 803 performs the method described above in association with FIGS. 3 and 4. That is, via the user interface 805, the search system 803 receives the NLQ from the user and optionally the desired depth of search. The evaluator 825 uses these inputs, together with the appropriate corpus 823, to produce a set of significant events associated with the respective NLQ as described above. The system stores the NLQs in NLQ store 821 and the significant events in event store 822 for future use. After many searches have been performed, the search system 803 will have accumulated many NLQs and associated sets of significant events in the NLQ and event stores 821, 823.

The clustering module 807 receives the NLQs and associated events from the search system 803, and then the clustering module 807 looks at commonalities across the set of significant events to cluster the NLQ queries. As illustrated, the clusters are stored in the cluster store 827 and the search system user interface 805 is used to view the clusters. However, in alternative embodiments of the invention the clusters are stored in the clustering module 807 which has its own user interface.

Most prior art techniques for clustering natural language queries (NLQs) rely on evaluating linguistic and semantic features of the queries. In preferred embodiments of the invention, the system clusters NLQs by examining what significant events are produced for these queries. This could be in addition to other commonly used techniques for clustering such as identifying common linguistic and semantic features. In preferred embodiments, NLQs would be grouped in the same cluster if they produce a threshold number, N, of similar events of significance in common. For example, if 2 NLQs produce 7 out of top 10 returned events, then those NLQs would belong to the same cluster. In another embodiment, NLQs are clustered together if they share a similar distribution profile of produced events of significance (for example, 60% of events from level 1 analysis, 25% of events from level 2 analysis, 10% of events from level 3 analysis and 5% of events from level 4 analysis). In yet another embodiment, the user can configure the parameters for the clustering method to specify what commonalities in events of significance are to be used to guide the clustering solution. For example, the user can set the threshold number of events of significance in common and a threshold commonality between the common linguistic and semantic features of respective NLQs as clustering criterions.

The present invention has many advantages over the prior art. By performing deep level entity extraction, embodiments of the invention identify events that would not be returned by the prior art which performs a single level search. Embodiments reference original entities in the query and extract entities referenced in those events returned by the query and then iterate the search process in an n-level search until the significance scores of new events and new entities become negligible, or fail to meet a threshold. In embodiments of the invention, a scaling factor is used to adjust the significance of events found in deeper levels of the search and a metric of mutual information (MMI) is used to measure the strength of the relationships between the extracted entities in relation to the original entities in the query.

Although the present invention is described in terms of entities, as the preferred embodiments of the invention use entities, in alternative embodiments of the invention other types of keywords are used.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. An improved method for searching a selected corpus by clustering a set of natural language queries (NLQ) based on a set of significant events retrieved from a corpus stored in a computer system comprising:
   using a set of NLQs by a search engine for searching a selected corpus to retrieve respective sets of significant events from the selected corpus;
   for each NLQ in the set of NLQs, extracting a first set of entities from the NLQ and using the first set of entities to search for a first set of significant events in the selected corpus in a first search pass;
   extracting a second set of entities from the first set of significant events and using the second set of entities to search for a second set of significant events in the selected corpus in a second search pass;
   producing a distribution profile for each NLQ based on a threshold number of significant events retrieved in a respective first search pass and a respective second search pass;
   clustering the set of NLQs into NLQ clusters according to the distribution profiles;
   and
   using a respective NLQ cluster in a query expansion of an initial user NLQ in the search engine.

2. The method as recited in claim 1, wherein the clustering is also based in part on common linguistic and semantic features of respective NLQs.

3. The method as recited in claim 2, further comprising:
   from user input, receiving a threshold number of significant events as a clustering criterion; and
   from user input, receiving a threshold number of common linguistic and semantic features in an NLQ as a clustering criterion.

4. The method as recited in claim 1, further comprising:
   building a knowledge graph based on a selected corpus stored in the computer system, the knowledge graph having a set of co-occurrence scores on edges of the knowledge graph between respective events in the selected corpus placed at the nodes of the knowledge graph, wherein the co-occurrence scores indicate co-occurrence of entities within respective pairs of events in the selected corpus; and
   using the knowledge graph to extract the second set of entities.

5. The method as recited in claim 1, further comprising:
   extracting a third set of entities from the second set of significant events and using the third set of entities to search for a third set of significant events in the selected corpus in a third search pass; and
   producing a distribution profile for each NLQ based on a number of significant events retrieved in the first search pass, the second search pass and the third search pass.

6. The method as recited in claim 1, further comprising:
   determining a significance score for respective events retrieved by the search system according to a metric of mutual information (MMI); and
   filtering the retrieved events according to respective significance scores to produce the first set of significant events.

7. The method as recited in claim 1, wherein the first and second sets of entities have no common members.

8. Apparatus, comprising:
   a processor;
   computer memory holding computer program instructions executed by the processor for improved searching of a selected corpus by clustering a set of natural language queries (NLQ), the computer program instructions comprising:

program code, operative to use a set of NLQs by for searching a selected corpus to retrieve respective sets of significant events from the selected corpus;

program code, operative to extract a first set of entities from the NLQ and using the first set of entities to search for a first set of significant events in the selected corpus in a first search pass;

program code, operative to extract a second set of entities from the first set of significant events and using the second set of entities to search for a second set of significant events in the selected corpus in a second search pass;

program code, operative to producing a distribution profile for each NLQ based on a threshold number of significant events retrieved in a respective first search pass and a respective second search pass;

program code, operative to cluster the set of NLQs into NLQ clusters according to the distribution profiles; and program code, operative to use a respective NLQ cluster in a query expansion of an initial user NLQ in the search engine.

9. The apparatus as recited in claim 8, wherein the clustering is also based in part on common linguistic and semantic features of respective NLQs.

10. The apparatus as recited in claim 9, further comprising:

program code, operative to receive a threshold number of significant events as a clustering criterion; and program code, operative to receive a threshold number of common linguistic and semantic features in an NLQ as a clustering criterion.

11. The apparatus as recited in claim 8, further comprising:

program code, operative to build a knowledge graph based on a selected corpus stored in the computer system, the knowledge graph having a set of co-occurrence scores on edges of the knowledge graph between in the selected corpus placed at the nodes of the knowledge graph, wherein the co-occurrence scores indicate co-occurrence of entities within respective pairs of events in the selected corpus; and program code, operative to use the knowledge graph to extract the second set of entities.

12. The apparatus as recited in claim 8, further comprising:

program code, operative to extract a third set of entities from the second set of significant events and using the third set of entities to search for a third set of significant events in the selected corpus in a third search pass; and program code, operative to produce a distribution profile for each NLQ based on a number of significant events retrieved in the first search pass, the second search pass and the third search pass.

13. A computer program product in a non-transitory computer readable medium for use in a data processing system, the computer program product holding computer program instructions executed by the data processing system for improved searching of a selected corpus by performing clustering of natural language queries (NLQ), the computer program instructions comprising:

program code, operative to use a set of NLQs by for searching a selected corpus to retrieve respective sets of significant events from the selected corpus;

program code, operative to extract a first set of entities from the NLQ and using the first set of entities to search for a first set of significant events in the selected corpus in a first search pass;

program code, operative to extract a second set of entities from the first set of significant events and using the second set of entities to search for a second set of significant events in the selected corpus in a second search pass;

program code, operative to producing a distribution profile for each NLQ based on a threshold number of significant events retrieved in a respective first search pass and a respective second search pass;

program code, operative to cluster the set of NLQs into NLQ clusters according to the distribution profiles; and program code, operative to use a respective NLQ cluster in a query expansion of an initial user NLQ in the search engine.

14. The computer program product as recited in claim 13, further comprising:

program code, operative to cluster based on common linguistic and semantic features of respective NLQs.

15. The computer program product as recited in claim 14, further comprising:

program code, operative to receive a threshold number of significant events as a clustering criterion; and program code, operative to receive a threshold number of common linguistic and semantic features in an NLQ as a clustering criterion.

16. The computer program product as recited in claim 13, further comprising:

program code, operative to build a knowledge graph based on a selected corpus stored in the computer system, the knowledge graph having a set of co-occurrence scores on edges of the knowledge graph between respective events in the selected corpus placed at the nodes of the knowledge graph, wherein the co-occurrence scores indicate the co-occurrence of entities within respective pairs of events in the selected corpus; and program code, operative to use the knowledge graph to extract the second set of entities.

* * * * *